US012619005B2

(12) United States Patent
Choi et al.

(10) Patent No.: US 12,619,005 B2
(45) Date of Patent: May 5, 2026

(54) OPTICAL FILM WITH IMPROVED OPTICAL PROPERTIES, DISPLAY APPARATUS COMPRISING SAME, AND MANUFACTURING METHOD THEREFOR

(71) Applicant: KOLON INDUSTRIES, INC., Seoul (KR)

(72) Inventors: Doo Li Choi, Seoul (KR); Hak-Gee Jung, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 556 days.

(21) Appl. No.: 18/247,504

(22) PCT Filed: Dec. 24, 2021

(86) PCT No.: PCT/KR2021/019822

§ 371 (c)(1),
(2) Date: Mar. 31, 2023

(87) PCT Pub. No.: WO2022/145890

PCT Pub. Date: Jul. 7, 2022

(65) Prior Publication Data

US 2023/0375750 A1 Nov. 23, 2023

(30) Foreign Application Priority Data

Dec. 31, 2020 (KR) ........................ 10-2020-0188965
Dec. 23, 2021 (KR) ........................ 10-2021-0186266

(51) Int. Cl.

*G02B 1/04* (2006.01)
*C08G 73/14* (2006.01)
*G06F 1/16* (2006.01)

(52) U.S. Cl.

CPC ............... *G02B 1/04* (2013.01); *C08G 73/14* (2013.01); *G06F 1/1607* (2013.01); *G06F 2200/161* (2013.01)

(58) Field of Classification Search

CPC ...... C08G 73/14; G02F 1/133723; G02B 1/04
See application file for complete search history.

(56) References Cited

FOREIGN PATENT DOCUMENTS

| | | | |
|---|---|---|---|
| CN | 107428962 | A | 12/2017 |
| CN | 109071814 | A | 12/2018 |
| CN | 110100192 | A | 8/2019 |
| KR | 20150076114 | A | 7/2015 |
| KR | 20170001644 | A | 1/2017 |
| KR | 20170079114 | A | 7/2017 |
| KR | 20190087397 | A | 7/2019 |
| TW | 202043819 | A | 12/2020 |
| WO | 2011065131 | A1 | 6/2011 |
| WO | 2017179877 | A1 | 10/2017 |

OTHER PUBLICATIONS

Won et al (WO 2016108675), English translation, published on Jul. 7, 2016.*
The office action dated Jan. 22, 2025 related to the corresponding Chinese Patent application.

* cited by examiner

*Primary Examiner* — Gregory Listvoyb
(74) *Attorney, Agent, or Firm* — Harvest IP Law, LLP

(57) ABSTRACT

The present invention provides an optical film comprising a polymer resin, which comprises a first repeating unit, a second repeating unit, a third repeating unit and a fourth repeating unit, wherein the optical index of the film is 1.0%/GU or more, the first repeating unit is an imide repeating unit derived from a first diamine-based compound and a dianhydride-based compound, the second repeating unit is an imide-repeating unit derived from a second diamine-based compound and a dianhydride-based compound, the third repeating unit is an amide-repeating unit derived from a first diamine-based compound and a dicarbonyl-based compound, the fourth repeating unit is an amide-repeating unit derived from a second diamine-based compound and a dicarbonyl-based compound, the first diamine-based compound is 2,2'-bis(trifluoromethyl)benzidine (TFDB), the second diamine-based compound includes an aromatic diamine-based compound, and the third repeating unit and the fourth repeating unit are included in a proportion of 80% or more with respect to the total number of the repeating units comprising the first to fourth repeating units.

12 Claims, 1 Drawing Sheet

OPTICAL FILM WITH IMPROVED OPTICAL PROPERTIES, DISPLAY APPARATUS COMPRISING SAME, AND MANUFACTURING METHOD THEREFOR

CROSS REFERENCE TO RELATED APPLICATION(S)

This application is a National Stage of International Application No. PCT/KR2021/019822 filed Dec. 24, 2021, claiming priority based on Korean Patent Application No. 10-2020-0188965 filed Dec. 31, 2020 and Korean Patent Application No. 10-2021-0186266 filed Dec. 23, 2021, the disclosures of which are incorporated herein by reference in their entireties.

TECHNICAL FIELD

The present disclosure relates to an optical film having excellent optical properties, and more particularly to an optical film having a high optical index, a display device including the same, and a method for manufacturing the same.

BACKGROUND ART

Recently, the use of an optical film instead of glass as a cover window of a display device has been considered with the goal of reducing the thickness and weight of the display device and increasing the flexibility thereof. In order for the optical film to be usable as a cover window of a display device, the optical film needs to have excellent optical and mechanical properties.

Therefore, it is necessary to develop a film that exhibits excellent optical properties as well as superior mechanical properties, such as insolubility, chemical resistance, heat resistance, radiation resistance, and good low-temperature characteristics.

Among optical films, polyimide (PI)-based resins have excellent insolubility, chemical resistance, heat resistance, radiation resistance and low-temperature characteristics, and are used as automobile materials, aviation materials, spacecraft materials, insulating coatings, insulating films, protective films, and the like.

Recently, polyamide-imide-based resins having amide repeating units added to polyimide-based resins have been developed, and films prepared using polyamide-imide-based resins have superior optical properties as well as excellent insolubility, chemical resistance, heat resistance, radiation resistance, and low-temperature characteristics. Such polyamide-imide-based resins may be prepared using a diamine-based compound, a dianhydride-based compound, and a dicarbonyl-based compound as monomers.

However, for example, 2,2'-bis(trifluoromethyl)benzidine (TFDB) used as the diamine causes a problem in that, during polymerization of TFDB with a large amount of dicarbonyl-based compound, the dicarbonyl-based compound is gelled due to the rigid structure of TFDB, so the polymerization reaction is insufficient.

Therefore, there is a need to develop a polyamide-imide-based resin having a high degree of polymerization even when a large amount of dicarbonyl is added.

DISCLOSURE

Technical Problem

It is an aspect of the present disclosure to provide an optical film that contains a polymer resin having a high degree of polymerization even when a large amount of dicarbonyl is added.

It is another aspect of the present disclosure to provide an optical film that exhibits excellent optical properties.

It is another aspect of the present disclosure to provide a method for manufacturing an optical film that contains a polymer resin having a high degree of polymerization.

Technical Solution

In accordance with the present disclosure, the above and other objects can be accomplished by the provision of an optical film containing a polymer resin including a first repeating unit, a second repeating unit, a third repeating unit, and a fourth repeating unit, the optical film having an optical index, calculated using the following Formula 1, of 1.0%/GU or more:

$$\text{Optical Index} = \frac{\text{Parallel transmittance}}{20°\ \text{Gloss} - RSPEC} \quad \text{[Equation 1]}$$

wherein a parallel transmittance of the film is obtained by measuring a parallel transmittance of a sample film having a size of 50 mm×50 mm three times using a haze meter (model name: HM-150, MURAKAMI Corporation) and calculating an average of three measurement values, and 20° gloss and RSPEC of the film are measured by placing white paper under one side of a sample film having a size of 30 mm×100 mm and performing measurement on a surface of the film using a gloss meter (Rhopoint Instruments, RHOPOINT IQ), wherein the first repeating unit is an imide repeating unit derived from a first diamine-based compound and a dianhydride-based compound, the second repeating unit is an imide repeating unit derived from a second diamine-based compound and the dianhydride-based compound, the third repeating unit is an amide repeating unit derived from the first diamine-based compound and a dicarbonyl-based compound, and the fourth repeating unit is an amide repeating unit derived from the second diamine-based compound and the dicarbonyl-based compound, wherein the first diamine-based compound is 2,2'-bis(trifluoromethyl)benzidine (TFDB) and the second diamine-based compound comprises an aromatic diamine-based compound, and a sum of numbers of the third and fourth repeating units is 80% or more of a total number of repeating units including the first to fourth repeating units.

The second diamine-based compound may include at least one selected from the group consisting of bis(3-aminophenyl)sulfone (3DDS), bis(4-aminophenyl)sulfone (ODDS), 2,2-bis(3-amino-4-methylphenyl)hexafluoropropane (AMH), 9,9-bis(4-aminophenyl)fluorene (FDA), 9,9-bis(3-fluoro-4-aminophenyl)fluorene (FFDA), m-phenylene diamine (mPDA), p-methylene dianiline (pMDA), m-methylene dianiline (mMDA), 1,3-bis(3-aminophenoxy)benzene (133APB), 1,3-bis(4-aminophenoxy)benzene (134APB), 1,4-bis(4-aminophenoxy)benzene (144APB), 2,2'-bis(3-aminophenyl)hexafluoropropane (33-6F), 2,2'-bis(4-aminophenyl)hexafluoropropane (44-6F), 2,2-bis(3-amino-4-hydroxy-phenyl)-hexafluoropropane (6FAP), 2,2-bis(4-(4-aminophenoxy)phenyl)hexafluoropropane (HFBAPP), bis(4-(4-aminophenoxy)phenyl)sulfone (BAPS), bis(4-(3-aminophenoxy)phenyl)sulfone (BAPSM), 2,2-bis(4-(4-aminophenoxy)phenyl propane (BAPP), 4,4-bis(4-aminophenoxy) biphenyl (BAPB), 3,3-diamino-4,4,-dihydroxydiphenylsulfone (DABS), 2,2,-bis(3-amino-4- hydroxyphenyl)propane (BAP), 4,4'-oxydianiline (4-ODA), and 3,3'-oxydianiline (3-ODA).

A ratio of a number of repeating units derived from the first diamine-based compound to a number of repeating units derived from the second diamine-based compound may be 95:5 to 50:50.

The optical film may have a yellowness index (Y.I.) of 3.0 or less based on a thickness of 50 μm.

The optical film may have a light transmittance of 88.50% or more based on a thickness of 50 μm.

The optical film may have a 20° gloss of 200 to 250 GU based on a thickness of 50 μm.

The optical film may have an RSPEC of 140 to 190 GU based on a thickness of 50 μm.

In accordance with another aspect of the present disclosure, there is provided a display device including a display panel, and the optical film disposed on the display panel.

In accordance with another aspect of the present disclosure, there is provided a method for manufacturing an optical film, the method including forming a first reaction solution using a first diamine-based compound, a second diamine-based compound, a dianhydride-based compound, and a dicarbonyl-based compound, adding a dehydrating agent and an imidization catalyst to the first reaction solution and allowing a reaction to occur therebetween to form a second reaction solution, treating the second reaction solution to prepare a polymer resin in a solid phase, dissolving the solid-phase polymer resin to prepare a polymer resin solution, and casting the polymer resin solution, wherein the first diamine-based compound is 2,2'-bis(trifluoromethyl) benzidine (TFDB) and the second diamine-based compound includes an aromatic diamine-based compound, the dicarbonyl-based compound has a bulk density of 0.5 to 0.8 g/ml, and a content of the dicarbonyl-based compound is 80 parts by mole or more and a content of the dianhydride-based compound is 20 parts by mole or less with respect to 100 parts by mole of a total content of the first diamine-based compound and the second diamine-based compound.

The method may further include reducing the bulk density of the dicarbonyl-based compound before forming the first reaction solution.

The second diamine-based compound may include at least one selected from the group consisting of bis(3-aminophenyl)sulfone (3DDS), bis(4-aminophenyl)sulfone (ODDS), 2,2-bis(3-amino-4-methylphenyl)hexafluoropropane (AMH), 9,9-bis(4-aminophenyl)fluorene (FDA), 9,9-bis(3-fluoro-4-aminophenyl)fluorene (FFDA), m-phenylene diamine (mPDA), p-methylene dianiline (pMDA), m-methylene dianiline (mMDA), 1,3-bis(3-aminophenoxy)benzene (133APB), 1,3-bis(4-aminophenoxy)benzene (134APB), 1,4-bis(4-aminophenoxy)benzene (144APB), 2,2'-bis(3-aminophenyl)hexafluoropropane (33-6F), 2,2'-bis(4-aminophenyl)hexafluoropropane (44-6F), 2,2-bis(3-amino-4-hydroxy-phenyl)-hexafluoropropane (6FAP), 2,2-bis(4-(4-aminophenoxy)phenyl)hexafluoropropane (HFBAPP), bis (4-(4-aminophenoxy)phenyl)sulfone (BAPS), bis(4-(3-aminophenoxy)phenyl)sulfone (BAPSM), 2,2-bis(4-(4-aminophenoxy)phenyl propane (BAPP), 4,4-bis(4-aminophenoxy) biphenyl (BAPB), 3,3-diamino-4,4,-dihydroxydiphenylsulfone (DABS), 2,2,-bis(3-amino-4-hydroxyphenyl)propane (BAP), 4,4'-oxydianiline (4-ODA), and 3,3'-oxydianiline (3-ODA).

A content of the first diamine-based compound may be 50 to 95 parts by mole and a content of the second diamine-based compound may be 5 to 50 parts by mole with respect to 100 parts by mole of a total content of the first diamine-based compound and the second diamine-based compound.

Advantageous Effects

According to an embodiment of the present disclosure, an optical film containing a polymer resin having an excellent degree of polymerization, even when a large amount of the dicarbonyl-based compound is added, can be provided by controlling the polymerization reaction of the diamine-based compound and the dicarbonyl-based compound.

An embodiment of the present disclosure provides an optical film having excellent optical properties.

Another embodiment of the present disclosure provides a method for manufacturing an optical film that is capable of providing an optical film that has a high degree of polymerization and excellent optical properties even when a large amount of a dicarbonyl-based compound is added.

The optical film according to another embodiment of the present disclosure exhibits excellent optical and mechanical properties and thus is capable of effectively protecting the display surface of a display device when used as a cover window of the display device.

BEST MODE

Figure 1:
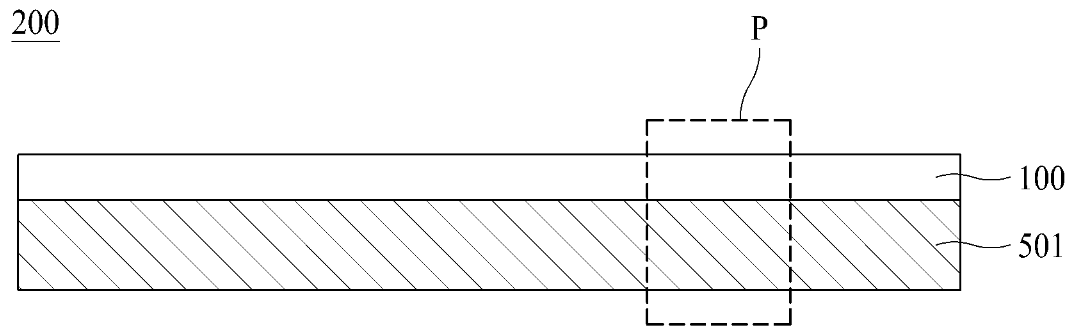
FIG. 1 is a cross-sectional view illustrating a part of a display device according to an embodiment of the present disclosure.

Hereinafter, embodiments of the present disclosure will be described in detail with reference to the accompanying drawings. However, the following embodiments are illustratively provided merely for clear understanding of the present disclosure, and do not limit the scope of the present disclosure.

The shapes, sizes, ratios, angles, and numbers disclosed in the drawings for describing embodiments of the present disclosure are merely examples, and the present disclosure is not limited to the illustrated details. Like reference numerals refer to like elements throughout the present specification. In the following description, when a detailed description of relevant known functions or configurations is determined to unnecessarily obscure important points of the present disclosure, the detailed description will be omitted.

In the case in which the term such as “comprise”, “have”, or “include” is used in the present specification, another part may also be present, unless “only” is used. Terms in a singular form may include the plural meanings, unless noted to the contrary. Also, in construing an element, the element is to be construed as including an error range even if there is no explicit description thereof.

In describing a positional relationship, for example, when the positional relationship is described as “on”, “above”, “below”, or “next”, the case of no contact therebetween may be included, unless “just” or “directly” is used.

Spatially relative terms, such as “below”, “beneath”, “lower”, “above”, and “upper”, may be used herein to describe the relationship between a device or element and another device or element, as shown in the figures. It will be understood that spatially relative terms are intended to encompass different orientations of a device during the use or operation of the device, in addition to the orientation depicted in the figures. For example, if a device in one of the figures is turned upside down, elements described as “below” or “beneath” other elements would then be positioned "above" the other elements. The exemplary term "below" or "beneath" can, therefore, encompass the meanings of both "below" and "above". In the same manner, the exemplary term "above" or "upper" can encompass the meanings of both "above" and "below".

In describing temporal relationships, for example, when a temporal order is described using "after", "subsequent", "next", or "before", the case of a non-continuous relationship may be included, unless "just" or "directly" is used.

It will be understood that, although the terms "first", "second", etc. may be used herein to describe various elements, these elements are not limited by these terms. These terms are only used to distinguish one element from another. Therefore, a first element could be termed a second element within the technical idea of the present disclosure.

It should be understood that the term "at least one" includes all combinations related with one or more items. For example, "at least one among a first element, a second element, and a third element" may include all combinations of two or more elements selected from among the first, second, and third elements, as well as each of the first, second, and third elements.

Features of various embodiments of the present disclosure may be partially or completely coupled to or combined with each other, and may be variously interoperated with each other and driven technically. The embodiments of the present disclosure may be carried out independently from each other, or may be carried out together in an interrelated manner.

An embodiment of the present disclosure provides an optical film. The optical film according to the embodiment of the present disclosure contains a polymer resin.

The polymer resin may be contained in the film in any one of various shapes and forms, for example, as a solid powder, in the state of being dissolved in a solution, or as a matrix solidified after having been dissolved in a solution. Any resin may be considered as the same as the polymer resin of the present disclosure, regardless of the shape and form, as long as it is a resin containing the same repeating unit as in the present disclosure. In general, the polymer resin may exist in the film in the form of a matrix, obtained by applying a polymer resin solution and drying the same to form a solid.

The optical film according to an embodiment of the present disclosure may include at least one of an imide repeating unit and an amide repeating unit. For example, the optical film according to an embodiment of the present disclosure may contain at least one of a polyimide-based polymer, a polyamide-based polymer, and a polyamide-imide-based polymer.

The optical film according to an embodiment of the present disclosure may include an imide repeating unit formed by a diamine-based compound and a dianhydride-based compound.

The optical film according to an embodiment of the present disclosure may include an amide repeating unit formed by a diamine-based compound and a dicarbonyl-based compound.

The optical film according to an embodiment of the present disclosure may include both an amide repeating unit and an imide repeating unit formed by a diamine-based compound, a dianhydride-based compound, and a dicarbonyl-based compound.

For example, the optical film according to an embodiment of the present disclosure may contain at least one of a polyimide-based resin, a polyamide-based resin, and a polyamide-imide-based resin.

According to an embodiment of the present disclosure, the optical film may be any one of a polyimide-based film, a polyamide-based film, and a polyamide-imide-based film, but the embodiments of the present disclosure are not limited thereto. Any film having light transmittance may be used as the optical film according to an embodiment of the present disclosure.

The polymer resin according to an embodiment of the present disclosure includes a first repeating unit, a second repeating unit, a third repeating unit, and a fourth repeating unit.

The first repeating unit is an imide repeating unit derived from a first diamine-based compound and a dianhydride-based compound, and the second repeating unit is an imide repeating unit derived from a second diamine-based compound and the dianhydride-based compound.

The third repeating unit is an amide repeating unit derived from the first diamine-based compound and a dicarbonyl-based compound, and the fourth repeating unit is an amide repeating unit derived from the second diamine-based compound and the dicarbonyl-based compound.

The sum of the numbers of the amide repeating units including the third and fourth repeating units is 80% or more of the total number of repeating units including the first to fourth repeating units.

As used herein, the term "repeating unit derived . . . " means that multiple monomers for forming a polymer are linked to one another and are repeatedly arranged in the polymer. This term is widely used in the field to which the present disclosure pertains. For example, polyethylene, which is a polymer having repeating units derived from ethylene, has a structure in which multiple ethylene monomers are linked to one another and are repeatedly arranged in a polyethylene polymer.

In the present disclosure, the imide repeating unit of the polymer resin may be prepared from monomer components including a diamine-based compound and a dianhydride-based compound. Specifically, the diamine-based compound and the dianhydride-based compound are polymerized to form amic acid, and the amic acid is imidized to form an imide repeating unit. In addition, the amide repeating unit may also be prepared through polymerization of monomer components including a diamine-based compound and a dicarbonyl-based compound. The specific structures of the imide repeating unit and the amide repeating unit may vary depending on the monomers used for the reaction.

However, the polymer resin according to an embodiment of the present disclosure is not limited thereto. The polymer resin according to an embodiment of the present disclosure may be prepared from monomer components further including other compounds, in addition to the diamine-based compound, the dianhydride-based compound, and the dicarbonyl-based compound. Therefore, the polymer resin according to an embodiment of the present disclosure may further include other repeating units, in addition to the imide repeating unit and the amide repeating unit.

According to an embodiment of the present disclosure, the optical film has an optical index, calculated using the following Formula 1, of 1.0%/GU or more:

$$\text{Optical Index} = \frac{\text{Parallel transmittance}}{20^\circ\ \text{Gloss} - RSPEC} \quad \text{[Equation 1]}$$

The optical index of the film of the present disclosure is obtained by dividing the parallel transmittance by the difference between 20° gloss and RSPEC.

The parallel transmittance of the film in the present disclosure may be obtained by measuring parallel transmittance of a sample film having a size of 50 mm×50 mm three times using a haze meter (model name: HM-150, MURAKAMI Corporation) and calculating the average of the three values. In addition, in the present disclosure, the 20° gloss and RSPEC of the film may be measured by placing white paper under one side of a sample film having a size of 30 mm×100 mm and measuring the same of the surface of film using a gloss meter (Rhopoint Instruments, RHOPOINT IQ).

In Equation 1, the parallel transmittance is a value obtained by subtracting the diffuse transmittance from the total transmittance of the film. In other words, parallel transmittance is expressed as "total transmittance−diffuse transmittance".

In Equation 1, 20° gloss is gloss expressed based on the amount of light reflected from the surface of the film. In general, gloss of a film is measured at an angle of 60°. However, when a gloss is high (when the gloss measured at an angle of 60° is 70 GU or more), a gloss at an angle of 20° is measured. As used herein, the term "20° gloss" refers to the gloss measured at an angle of 20° of a high-gloss film.

In Equation 1, RSPEC represents a peak reflectance, which is measured at a narrow angle (20°±0.09905°). RSPEC changes greatly depending on the texture of the surface. RSPEC measured from a film may indicate a difference in texture that is difficult to detect from a smooth surface. The value of RSPEC decreases as the amount of foreign matter on the surface of the film increases. That is, if the RSPEC and gloss values are identical, the surface of the film is considered smooth, and if there is more foreign matter (irregularities) on the surface, the RSPEC value decreases.

As the value "20° gloss−RSPEC" decreases, the surface of the film becomes smoother.

The present inventors have found that the parallel transmittance and surface properties of the optical film affect the visibility of the optical film. Specifically, as the parallel transmittance of the optical film increases and the smoothness of the surface of the film increases, the optical properties improve and thus visibility increases. As shown in Equation 1 above, the optical index of the film of the present disclosure is obtained by dividing the parallel transmittance by the difference between 20° gloss and RSPEC. As the optical index of the film increases, parallel transmittance increases, and as the surface of the film becomes smoother, the optical index of the optical film increases, and thus visibility improves.

The optical film of the present disclosure has an optical index of 1.0%/GU or more. The optical index of a film is a parameter for evaluating the optical properties of the film. When the optical film has an optical index of less than 1.0%/GU, it is useless due to the low transparency thereof.

According to an embodiment of the present disclosure, the content of the dicarbonyl-based compound used in the manufacture of the optical film is 80 parts by mole or more with respect to 100 parts by mole of the total content of the dianhydride-based compound and the dicarbonyl-based compound, and the content of the dianhydride-based compound is 20 parts by mole or less with respect to 100 parts by mole of the total content of the dianhydride-based compound and the dicarbonyl-based compound. Preferably, the content of the dicarbonyl-based compound may be 95 parts by mole or more, and the content of the dianhydride-based compound may be 5 parts by mole or less. More preferably, the content of the dicarbonyl-based compound may be 98 parts by mole or more, and the content of the dianhydride-based compound may be 2 parts by mole or less.

In general, since the diamine-based compound reacts with the dianhydride-based compound or the dicarbonyl-based compound at a ratio of about 1:1 during the preparation of the polymer resin, the content of the dicarbonyl-based compound may be 80 parts by mole or more, and the content of the dianhydride-based compound may be 20 parts by mole or less, with respect to 100 parts by mole, which is the total content of the first diamine-based compound and the second diamine-based compound.

In addition, since the first and second repeating units are derived from the dianhydride-based compound and the third and fourth repeating units are derived from the dicarbonyl-based compound, the sum of the numbers of the amide repeating units including the third and fourth repeating units, included in the polymer resin, can be said to correspond to 80% or more of the total number of repeating units including the first to fourth repeating units. Preferably, the sum of numbers of the third and fourth repeating units can be said to correspond to 95% or more of the total number of repeating units, including the first to fourth repeating units, more preferably 98% or more thereof.

When the sum of the numbers of the amide repeating units including the third and fourth repeating units is 80% or more of the total number of repeating units including the first to fourth repeating units, the optical properties of the film can be maintained while the mechanical properties thereof can be improved. That is, since the optical film includes more of the amide repeating unit than the imide repeating unit, it is colorless and transparent, and has improved insolubility, chemical resistance, heat resistance, radiation resistance, low-temperature characteristics, tensile strength, elongation, and the like.

When a large amount of the dicarbonyl-based compound is added in order to form a large number of amide repeating units, there is a problem in that the degree of polymerization of the resin decreases because the dicarbonyl-based compound is gelled and thus the polymerization reaction is insufficiently performed. When the polymerization degree of the resin decreases, the optical index of the film is reduced, the visibility of the optical film is reduced, and the quality of the optical film is reduced.

In the present disclosure, the gelation of the dicarbonyl-based compound can be prevented or inhibited by performing polymerization using two or more different types of diamine-based compounds. Accordingly, the polymer resin of the present disclosure includes repeating units derived from at least two types of diamine-based compounds including the first diamine-based compound and the second diamine-based compound.

Specifically, according to an embodiment of the present disclosure, the first diamine-based compound is 2,2'-bis(trifluoromethyl)benzidine (TFDB), and the second diamine-based compound includes an aromatic diamine-based compound other than TFDB. The imide repeating unit and the amide repeating unit of the present disclosure may be derived from TFDB and an aromatic diamine-based compound other than TFDB.

Since the 2,2'-bis(trifluoromethyl)benzidine (TFDB) of the first diamine-based compound has a specific linear and rigid structure, a film that includes a repeating unit derived from TFDB can be imparted with greatly improved mechanical properties, such as insolubility, chemical resistance, heat resistance, radiation resistance, and low-temperature characteristics.

However, polymerization between TFDB and a dicarbonyl-based compound is accelerated due to the rigid structure of TFDB. Such rapid polymerization may allow only a part of the dicarbonyl-based compound to react with the diamine-based compound, and the remainder of the dicarbonyl-based compound may be gelled rather than being polymerized. The gelation of the dicarbonyl-based compound may reduce the degree of polymerization of the resin and deteriorate the optical properties of the film. Therefore, it is difficult to prepare a polymer resin including a large amount of amide repeating units merely through addition of TFDB. According to the present disclosure, the second diamine-based compound can prevent gelation of the dicarbonyl-based compound and improve the polymerization degree of the polymer.

According to an embodiment of the present disclosure, the second diamine-based compound includes an aromatic diamine-based compound.

In an embodiment of the present disclosure, the term "aromatic diamine-based compound" refers to a diamine-based compound in which an amino group is directly bonded to an aromatic ring, and may include an aliphatic group or other substituents as part of the structure thereof. The aromatic ring may be a single ring, a fused ring including a single ring linked thereto directly via a heteroatom, or a condensed ring. Examples of the aromatic ring may include, but are not limited to, a benzene ring, a biphenyl ring, a naphthalene ring, an anthracene ring, and a fluorene ring.

According to an embodiment of the present disclosure, the second diamine-based compound may be represented by the following Formula 1:

$H_2N-A^1-NH_2$ [Formula 1]

wherein $A^1$ represents a divalent aromatic organic group. The aromatic organic group refers to an organic group in which pi electrons are delocalized, whereby single bonds and double bonds alternately link to each other to form rings. For example, $A^1$ may include a divalent aromatic organic group having 4 to 40 carbon atoms. A hydrogen atom in the aromatic organic group in Formula 1 may be substituted with a halogen element, a hydrocarbon group, or a hydrocarbon group substituted with a halogen element. Here, the hydrocarbon group or the hydrocarbon group substituted with a halogen element may have 1 to 8 carbon atoms. For example, the hydrogen in A' may be substituted with —F, $—CH_3$, $—CF_3$, —OH or the like.

An optical film produced using a diamine-based compound in which a hydrogen atom is substituted with a fluorine-substituted hydrocarbon group can be imparted with excellent light transmittance and excellent workability.

$A^1$ in Formula 1 may, for example, include a structure represented by any one of the following formulas.

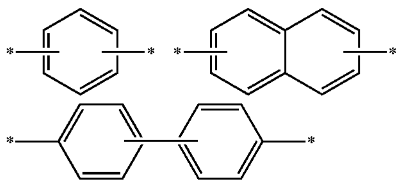

-continued

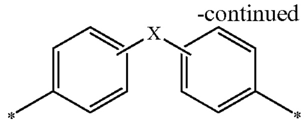

In the above formulas, * represents a bonding position. In the above formulas, X may have a structure represented by the following formulas. Although the bonding position of X on each ring is not particularly limited, the bonding position of X may be, for example, a meta or para position on each ring.

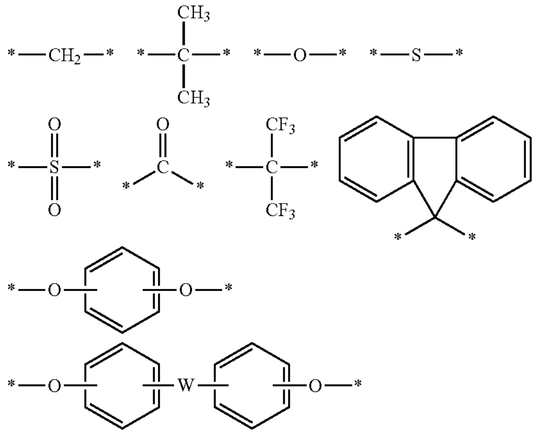

In the above formulas, * represents a bonding position. In the above formulas, W may independently be any one of a single bond, O, S, $SO_2$, CO, $CH_2$, $C(CH_3)_2$ and $C(CF_3)_2$. Although the bonding position of W on each ring is not particularly limited, the bonding position of W may be, for example, a meta or para position on each ring.

According to an embodiment of the present disclosure, the second diamine-based compound may include at least one selected from the group consisting of bis(3-aminophenyl)sulfone (3DDS), bis(4-aminophenyl)sulfone (ODDS), 2,2-bis(3-amino-4-methylphenyl)hexafluoropropane (AMH), 9,9-bis(4-aminophenyl)fluorene (FDA), 9,9-bis(3-fluoro-4-aminophenyl)fluorene (FFDA), m-phenylene diamine (mPDA), p-methylene dianiline (pMDA), m-methylene dianiline (mMDA), 1,3-bis(3-aminophenoxy)benzene (133APB), 1,3-bis(4-aminophenoxy)benzene (134APB), 1,4-bis(4-aminophenoxy)benzene (144APB), 2,2'-bis(3-aminophenyl)hexafluoropropane (33-6F), 2,2'-bis(4-aminophenyl)hexafluoropropane (44-6F), 2,2-bis(3-amino-4-hydroxy-phenyl)-hexafluoropropane (6FAP), 2,2-bis(4-(4-aminophenoxy)phenyl)hexafluoropropane (HFBAPP), bis (4-(4-aminophenoxy)phenyl)sulfone (BAPS), bis(4-(3-aminophenoxy)phenyl)sulfone (BAPSM), 2,2-bis(4-(4-aminophenoxy)phenyl propane (BAPP), 4,4-bis(4-aminophenoxy) biphenyl (BAPB), 3,3-diamino-4,4,-dihydroxydiphenylsulfone (DABS), 2,2,-bis(3-amino-4-hydroxyphenyl)propane (BAP), 4,4'-oxydianiline (4-ODA), and 3,3'-oxydianiline (3-ODA).

According to an embodiment of the present disclosure, the ratio of the number of repeating units derived from the first diamine-based compound to the number of repeating units derived from the second diamine-based compound (repeating units derived from first diamine-based compound: repeating units derived from second diamine-based compound) may be within the range of 95:5 to 50:50. Here, the term "the repeating unit derived from the first diamine-based compound (or the second diamine-based compound)" is meant to include both the imide repeating unit and the amide repeating unit derived from the first diamine-based compound (or the second diamine-based compound).

Since the repeating units derived from the first diamine-based compound are the first and third repeating units and the repeating units derived from the second diamine-based compound are the second and fourth repeating units, the sum of the numbers of first and third repeating units corresponds to 50% to 95% of the total number of repeating units including the first to fourth repeating units. That is, the content of the first diamine-based compound used for manufacturing the optical film may be 50 to 95 parts by mole based on 100 parts by mole of the total content of the first diamine-based compound and the second diamine-based compound, and the content of the second diamine-based compound may be 5 to 50 parts by mole based on 100 parts by mole of the total content of the first diamine-based compound and the second diamine-based compound.

When, with regard to "repeating units derived from first diamine-based compound: repeating units derived from second diamine-based compound", the fraction of the repeating units derived from the first diamine-based compound increases above 95:5, the fraction of the repeating units derived from the TFDB and the dicarbonyl-based compound increases, and haze increases. On the other hand, when the fraction of the repeating units derived from the second diamine-based compound increases above 50:50, the heat resistance and strength of the film may be reduced.

In an embodiment of the present disclosure, the dianhydride-based compound may be represented by the following Formula 2:

[Formula 2]

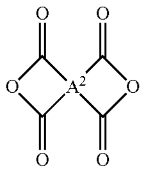

wherein $A^2$ represents a tetravalent organic group. For example, $A^2$ may include a tetravalent organic group having 4 to 40 carbon atoms. A hydrogen atom in the organic group in Formula 2 may be substituted with a halogen element, a hydrocarbon group, or a hydrocarbon group substituted with a halogen element. Here, the hydrocarbon group or the hydrocarbon group substituted with a halogen element may have 1 to 8 carbon atoms.

$A^2$ in Formula 2 may, for example, include a structure represented by any one of the following formulas.

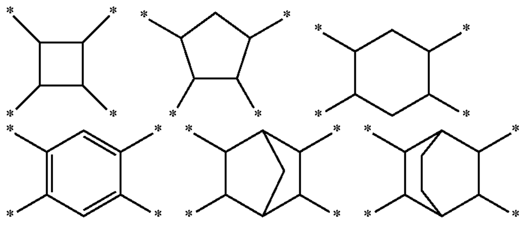

-continued

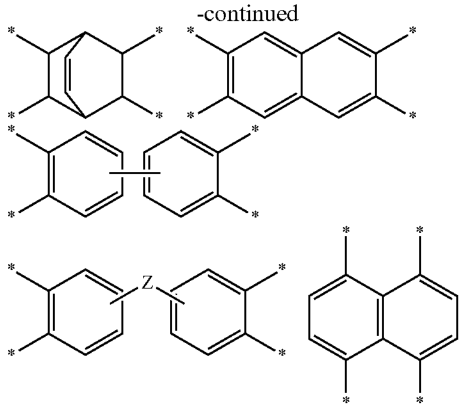

In the above formulas, * represents a bonding position. In the above formulas, Z may independently be any one of a single bond, O, S, $SO_2$, CO, $(CH_2)_n$, $(C(CH_3)_2)_n$, and $(C(CF_3)_2)_n$, and n may be an integer of 1 to 5. Although the bonding position of Z on each ring is not particularly limited, the bonding position of Z may be, for example, a meta or para position on each ring.

In an embodiment of the present disclosure, the dianhydride-based compound may include one or more selected from the group consisting of 2,2-bis(3,4-dicarboxyphenyl) hexafluoropropane dianhydride (6FDA), 4-(2,5-dioxotetrahydrofuran-3-yl)-1,2,3,4-tetrahydronaphthalene-1,2-dicarboxylic anhydride (TDA), pyromellitic dianhydride (1,2,4,5-benzene tetracarboxylic dianhydride, PMDA), 3,3,4,4-benzophenone tetracarboxylic dianhydride (BTDA), 3,3,4,4-biphenyltetracarboxylic dianhydride (BPDA), naphthalenetetracarboxylic dianhydride (NTDA), diphenylsulfonetetracarboxylic dianhydride (DSDA), 4,4-oxydiphthalic dianhydride (ODPA), bis(3,4-dicarboxyphenyl) dimethylsilane dianhydride (SIDA), 4,4-bis(3,4-dicarboxyphenoxy)diphenyl sulfide dianhydride (BDSDA), sulfonyldiphthalic anhydride ($SO_2$DPA), cyclobutane-1,2,3,4-tetracarboxylic dianhydride (CBDA), and 4,4'-(4,4'-isopropylidenediphenoxy)bis(phthalic anhydride) (BPADA). The monomer used in the manufacture of the optical film according to an embodiment of the present disclosure may include, for example, a plurality of kinds of dianhydride-based compounds.

An optical film produced using a dianhydride-based compound in which a hydrogen atom is substituted with a fluorine-substituted hydrocarbon group may be imparted with excellent light transmittance and excellent workability.

According to an embodiment of the present disclosure, the dicarbonyl-based compound may be represented by the following Formula 3:

[Formula 3]

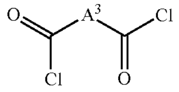

wherein $A^3$ represents a divalent organic group. For example, $A^3$ may include a divalent organic group having 4 to carbon atoms. A hydrogen atom in the organic group in Formula 3 may be substituted with a halogen element, a hydrocarbon group, or a fluorine-substituted hydrocarbon group. Here, the hydrocarbon group or the fluorine-substituted hydrocarbon group may have 1 to 8 carbon atoms. For example, the hydrogen in $A^3$ may be substituted with —F, —$CH_3$, —$CF_3$, or the like.

$A^3$ in Formula 3 may, for example, include a structure represented by any one of the following formulas.

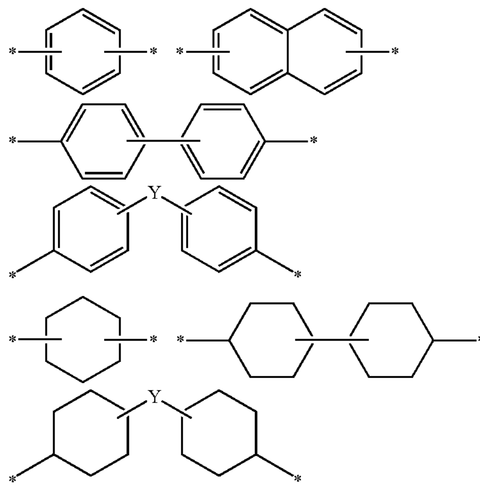

In the above formulas, * represents a bonding position. In the above formulas, Y may independently be any one of a single bond, O, S, $SO_2$, CO, $CH_2$, $C(CH_3)_2$ and $C(CF_3)_2$. Although the bonding position of Y on each ring is not particularly limited, the bonding position of Y may be, for example, a meta or para position on each ring.

According to an embodiment of the present disclosure, the dicarbonyl-based compound may include at least one selected from the group consisting of phthaloyl chloride, terephthaloyl chloride (TPC), isophthaloyl chloride (IPC), 4,4'-biphenyldicarbonyl chloride (DPDOC), 4,4'-oxybis (benzoyl chloride) (OBBOC), and naphthalene-2,3-dicarbonyl dichloride.

The polymer resin according to an embodiment of the present disclosure may include a first repeating unit represented by the following Formula 4 and a second repeating unit represented by the following Formula 5:

[Formula 4]

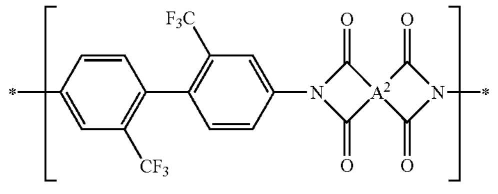

wherein $A^2$ is as described above, and

[Formula 5]

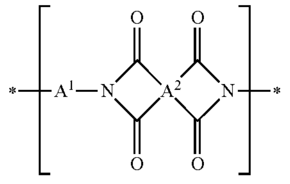

wherein $A^1$ and $A^2$ are as described above.

The polymer resin according to an embodiment of the present disclosure may include a third repeating unit represented by the following Formula 6 and a fourth repeating unit represented by the following Formula 7:

[Formula 6]

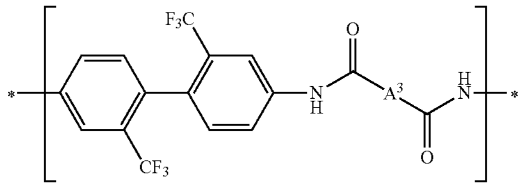

wherein $A^3$ is as described above, and

[Formula 7]

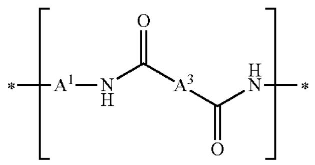

wherein $A^1$ and $A^3$ are as described above.

According to an embodiment of the present disclosure, the optical film is light-transmissive. In addition, the optical film is flexible. For example, the optical film according to an embodiment of the present disclosure is bendable, foldable, or rollable. The optical film may have excellent mechanical and optical properties.

According to an embodiment of the present disclosure, the optical film may have a thickness sufficient for the optical film to protect the display panel. For example, the optical film may have a thickness of 10 to 100 μm.

The optical film according to an embodiment of the present disclosure may have a yellowness index of 3.0 or less based on a thickness of 50 μm. In addition, the optical film according to an embodiment of the present disclosure may have a yellowness index of 2.0 or less, or a yellowness index of 1.0 or less, based on a thickness of 50 μm.

The optical film according to an embodiment of the present disclosure may have a light transmittance in the visible light region, measured using a UV spectrophotometer, of 88.50% or more based on a thickness of 50 μm. In addition, the optical film according to an embodiment of the present disclosure may have light transmittance of 90% or more, or light transmittance of 91% or more, based on a thickness of 50 μm.

The yellowness index and light transmittance may be measured in a wavelength range of 360 to 740 nm using a spectrophotometer according to the ASTM E313 standard. The spectrophotometer used herein may be, for example, CM-3700D manufactured by KONICA MINOLTA.

The optical film according to an embodiment of the present disclosure may have a parallel transmittance of 87.50% based on a thickness of 50 μm.

As described above, parallel transmittance is a value obtained by subtracting the diffuse transmittance of a film from the total transmittance thereof. In other words, parallel transmittance is expressed as “total transmittance diffuse transmittance”. That is, the parallel transmittance of the film may be obtained by measuring the parallel transmittance of a sample film having a size of 50 mm×50 mm three times using a haze meter (model name: HM-150, MURAKAMI Corporation) and calculating the average of the measured three values.

The optical film according to an embodiment of the present disclosure may have a 20° gloss of 200 to 250 GU based on a thickness of 50 μm.

20° gloss is a characteristic of gloss, expressed based on the amount of light reflected from the surface of the film. In general, the gloss of a film is measured at an angle of 60°. However, when a gloss is high (when the gloss measured at an angle of 60° is 70 GU or more), the gloss is measured at an angle of 20°. As used herein, the term “20° gloss” refers to the gloss of a high-gloss film, measured at an angle of 20°.

The optical film according to an embodiment of the present disclosure may have an RSPEC of 140 to 190 GU based on a thickness of 50 μm.

RSPEC represents a peak reflectance, which is measured at a narrow angle (20°±0.09905°). RSPEC changes greatly depending on the texture of the surface. The measured RSPEC of a film may indicate a difference in texture, which is difficult to detect for a smooth surface. The RSPEC value decreases as the amount of foreign matter on the surface of a film increases. That is, if the RSPEC and gloss values are identical, the surface of the film is considered smooth, and if there is more foreign matter (irregularities) on the surface, the RSPEC value decreases.

The 20° gloss and RSPEC may be measured by placing white paper under one side of a sample film having a size of 30 mm×100 mm and measuring the 20° gloss and RSPEC of the surface of the sample film using a gloss meter (Rhopoint Instruments, RHOPOINT IQ).

Hereinafter, a display device including the optical film according to an embodiment of the present disclosure will be described with reference to FIGS. 1 and 2.

Figure 2:
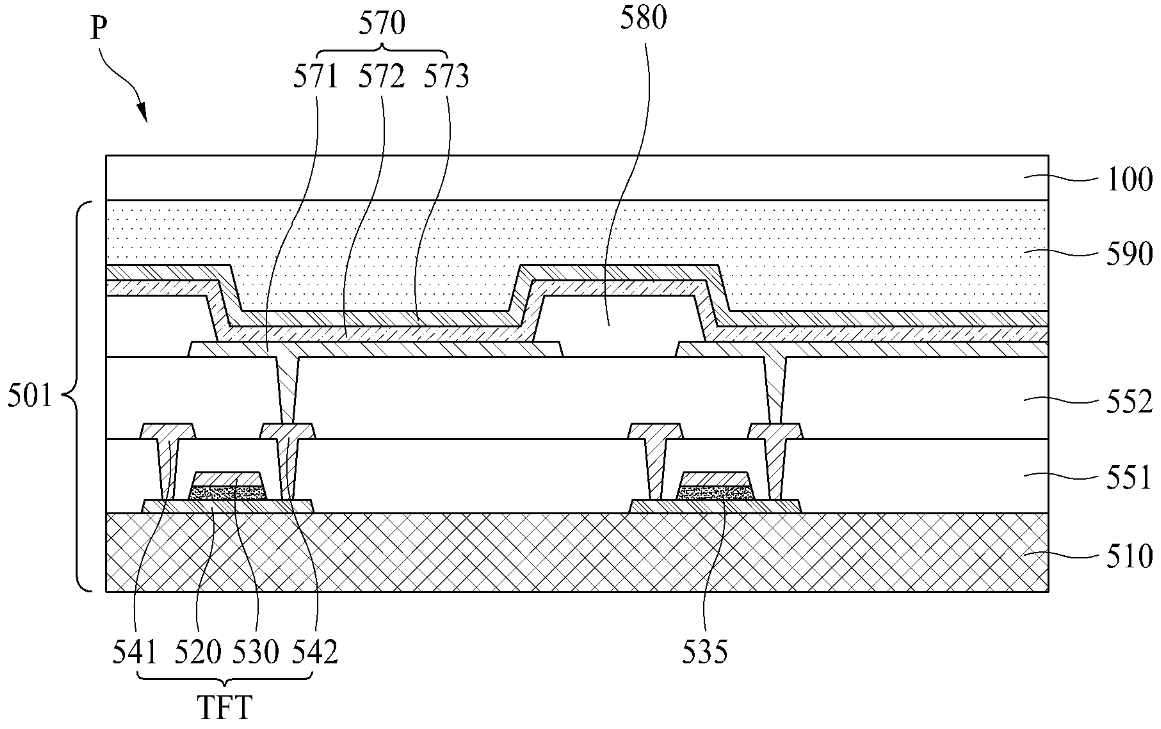
FIG. 2 is an enlarged cross-sectional view illustrating “P” of FIG. 1.

FIG. 1 is a cross-sectional view illustrating a part of a display device 200 according to another embodiment, and FIG. 2 is an enlarged cross-sectional view of “P” in FIG. 1. Referring to FIG. 1, the display device 200 according to another embodiment of the present disclosure includes a display panel 501 and an optical film 100 on the display panel 501.

Referring to FIGS. 1 and 2, the display panel 501 includes a substrate 510, a thin film transistor TFT on the substrate 510, and an organic light-emitting device 570 connected to the thin film transistor TFT. The organic light-emitting device 570 includes a first electrode 571, an organic light-emitting layer 572 on the first electrode 571, and a second electrode 573 on the organic light-emitting layer 572. The display device 200 shown in FIGS. 1 and 2 is an organic light-emitting display device.

The substrate 510 may be formed of glass or plastic. Specifically, the substrate 510 may be formed of plastic such as a polymer resin or an optical film. Although not shown, a buffer layer may be disposed on the substrate 510.

The thin film transistor TFT is disposed on the substrate 510. The thin film transistor TFT includes a semiconductor layer 520, a gate electrode 530 that is insulated from the semiconductor layer 520 and at least partially overlaps the semiconductor layer 520, a source electrode 541 connected to the semiconductor layer 520, and a drain electrode 542 that is spaced apart from the source electrode 541 and is connected to the semiconductor layer 520.

Referring to FIG. 2, a gate insulating layer 535 is disposed between the gate electrode 530 and the semiconductor layer 520. An interlayer insulating layer 551 may be disposed on the gate electrode 530, and a source electrode 541 and a drain electrode 542 may be disposed on the interlayer insulating layer 551.

A planarization layer 552 is disposed on the thin film transistor TFT to planarize the top of the thin film transistor TFT.

A first electrode 571 is disposed on the planarization layer 552. The first electrode 571 is connected to the thin film transistor TFT through a contact hole provided in the planarization layer 552.

A bank layer 580 is disposed on the planarization layer 552 in a part of the first electrode 571 to define pixel areas or light-emitting areas. For example, the bank layer 580 is disposed in the form of a matrix at the boundaries between a plurality of pixels to define the respective pixel regions.

The organic light-emitting layer 572 is disposed on the first electrode 571. The organic light-emitting layer 572 may also be disposed on the bank layer 580. The organic light-emitting layer 572 may include one light-emitting layer, or two light-emitting layers stacked in a vertical direction. Light having any one color among red, green, and blue may be emitted from the organic light-emitting layer 572, and white light may be emitted therefrom.

The second electrode 573 is disposed on the organic light-emitting layer 572.

The first electrode 571, the organic light-emitting layer 572, and the second electrode 573 may be stacked to constitute the organic light-emitting device 570.

Although not shown, when the organic light-emitting layer 572 emits white light, each pixel may include a color filter for filtering the white light emitted from the organic light-emitting layer 572 based on a particular wavelength. The color filter is formed in the light path.

A thin-film encapsulation layer 590 may be disposed on the second electrode 573. The thin-film encapsulation layer 590 may include at least one organic layer and at least one inorganic layer, and the at least one organic layer and the at least one inorganic layer may be alternately disposed.

The optical film 100 is disposed on the display panel 501 having the stack structure described above.

Hereinafter, a method of manufacturing an optical film according to another embodiment of the present disclosure will be described.

The method of manufacturing an optical film according to an embodiment of the present disclosure includes forming a first reaction solution using a first diamine-based compound, a second diamine-based compound, a dianhydride-based compound, and a dicarbonyl-based compound, adding a dehydrating agent and an imidization catalyst to the first reaction solution and allowing a reaction to occur therebetween to form a second reaction solution, treating the second reaction solution to prepare a polymer resin in a solid phase, dissolving the solid-phase polymer resin to prepare a polymer resin solution, and casting the polymer resin solution. Hereinafter, each step will be described in detail.

First, the first reaction solution is formed using the first diamine-based compound, the second diamine-based compound, the dianhydride-based compound, and the dicarbonyl-based compound.

The formation of the first reaction solution may be performed by polymerizing monomers for forming the polymer resin. The polymer resin may be prepared from monomer components including the first diamine-based compound, the second diamine-based compound, the dianhydride-based compound, and the dicarbonyl-based compound. There is no limitation as to the order or method of addition of the monomers in the present disclosure. For example, a dianhydride-based compound and a dicarbonyl-based compound may be added to a solution in which the diamine-based compound is dissolved, and the resulting mixture may be subjected to polymerization.

The solvent for preparing the first reaction solution may be, for example, a polar aprotic organic solvent such as N,N-dimethylacetamide (DMAc), N,N-dimethylformamide (DMF), 1-methyl-2-pyrrolidinone (NMP), m-cresol, tetrahydrofuran (THF), chloroform, methyl ethyl ketone (MEK), or a mixture thereof. However, the solvent according to an embodiment of the present disclosure is not limited thereto, and other solvents may be used.

2,2'-bis(trifluoromethyl)benzidine (TFDB) may be used as the first diamine-based compound, the aromatic diamine-based compounds of Formula 1 described above may be used as the second diamine-based compound, the compounds of Formula 2 described above may be used as the dianhydride-based compound, and the compounds represented by Formula 3 described above may be used as the dicarbonyl-based compound.

For example, the second diamine-based compound may be bis(3-aminophenyl)sulfone (3DDS), bis(4-aminophenyl) sulfone (ODDS), 2,2-bis(3-amino-4-methylphenyl) hexafluoropropane (AMH), 9,9-bis(4-aminophenyl)fluorene (FDA), 9,9-bis(3-fluoro-4-aminophenyl)fluorene (FFDA), m-phenylene diamine (mPDA), p-methylene dianiline (pMDA), m-methylene dianiline (mMDA), 1,3-bis(3-aminophenoxy)benzene (133APB), 1,3-bis 4-aminophenoxy benzene (134APB), 1,4-bis(4-aminophenoxy)benzene (144APB), 2,2'-bis(3-aminophenyl)hexafluoropropane (33-6F), 2,2'-bis(4-aminophenyl)hexafluoropropane (44-6F), 2,2-bis(3-amino-4-hydroxy-phenyl)-hexafluoropropane, (6FAP), 2,2-bis(4-(4-aminophenoxy)phenyl)hexafluoropropane (HFBAPP), bis(4-(4-aminophenoxy)phenyl)sulfone (BAPS), bis(4-(3-aminophenoxy)phenyl)sulfone (BAPSM), 2,2-bis(4-(4-aminophenoxy)phenyl propane (BAPP), 4,4-bis(4-aminophenoxy) biphenyl (BAPB), 3,3-diamino-4,4,-dihydroxydiphenylsulfone (DABS), 2,2,-bis(3-amino-4-hydroxyphenyl)propane (BAP), 4,4'-oxydianiline (4-ODA), 3,3'-oxydianiline (3-ODA), and the like.

The dianhydride-based compound may be 2,2-bis(3,4-dicarboxyphenyl)hexafluoropropane dianhydride (6FDA), 4-(2,5-dioxotetrahydrofuran-3-yl)-1,2,3,4-tetrahydronaphthalene-1,2-dicarboxylic anhydride (TDA), pyromellitic dianhydride (1,2,4,5-benzene tetracarboxylic dianhydride, PMDA), 3,3,4,4-benzophenone tetracarboxylic dianhydride (BTDA), 3,3,4,4-biphenyltetracarboxylic dianhydride (BPDA), naphthalenetetracarboxylic dianhydride (NTDA), diphenylsulfonetetracarboxylic dianhydride (DSDA), 4,4-oxydiphthalic dianhydride (ODPA), bis(3,4-dicarboxyphenyl)dimethylsilane dianhydride (SIDA), 4,4-bis(3,4-dicarboxyphenoxy)diphenyl sulfide dianhydride (BDSDA), sulfonyldiphthalic anhydride ($SO_2DPA$), cyclobutane-1,2,3,4-tetracarboxylic dianhydride (CBDA), 4,4'-(4,4'-isopropylidenediphenoxy)bis(phthalic anhydride) (6HBDA), or the like.

The dicarbonayl compound may be phthaloyl chloride, terephthaloyl chloride (TPC), isophthaloyl chloride (IPC), 4,4'-biphenyldicarbonyl chloride (DPDOC), 4,4'-oxybis (benzoyl chloride) (OBBOC), naphthalene-2,3-dicarbonyl dichloride, or the like.

The first diamine-based compound, the second diamine-based compound, the dianhydride-based compound, and the dicarbonyl-based compound may be used alone or in combination of two or more thereof.

According to an embodiment of the present disclosure, the dicarbonyl-based compound may be used in an amount of 80 parts by mole or more, and the dianhydride-based compound may be used in an amount of 20 parts by mole or less, based on 100 parts by mole, which is the total content of the first diamine-based compound and the second diamine-based compound. Preferably, the dicarbonyl-based compound may be used in an amount of 95 parts by mole or more, and more preferably, 98 parts by mole or more, based on 100 parts by mole, which is the total content of the first diamine-based compound and the second diamine-based compound.

The effects affected by the amount of the added dicarbonyl-based compound are as described above.

According to an embodiment of the present disclosure, the first diamine-based compound may be used in an amount of 50 to 95 parts by mole, based on 100 parts by mole, which is the total content of the first diamine-based compound and the second diamine-based compound.

The effects affected by the amount of the added first diamine-based compound are as described above.

According to another embodiment of the present disclosure, the dicarbonyl-based compound added to form the first reaction solution has a bulk density of 0.5 to 0.8 g/ml.

2,2'-bis(trifluoromethyl)benzidine (TFDB), which is the first diamine-based compound, is rapidly polymerized with a dicarbonyl-based compound due to the linear and rigid structure thereof. The dicarbonyl-based compound is added in the form of flakes due to the nature of the dicarbonyl-based compound preparation process. The reaction of the dicarbonyl flake mass with diamine proceeds rapidly around the outside thereof, and the dicarbonyl-based compound present therein may be gelled rather than participate in the polymerization. Gelation hinders control of the degree of polymerization of the resin, and the gelatinous mass reduces the transparency of the film.

According to another embodiment of the present disclosure, when a dicarbonyl-based compound having a bulk density of 0.5 to 0.8 g/ml is used, gelation of the dicarbonyl-based compound can be prevented or inhibited.

The bulk density of the dicarbonyl-based compound can be determined by calculating the average of three measured values in accordance with the ASTM D1895 standard, using apparent bulk density.

When the bulk density of the dicarbonyl-based compound is less than 0.5 g/ml, the raw material is blown off and is difficult to handle during processing. On the other hand, when the bulk density is more than 0.8 g/ml, gelation of the dicarbonyl-based compound becomes serious, and the optical properties and the optical index of the film decrease.

According to another embodiment of the present disclosure, the first reaction solution contains polyamic acid and a polyamide repeating unit. Polyamic acid is a precursor of polyimide.

According to another embodiment of the present disclosure, the method of manufacturing an optical film may further include reducing the bulk density of the dicarbonyl-based compound, before forming the first reaction solution.

The dicarbonyl-based compound is obtained as a liquid dicarbonyl-based compound through vacuum distillation in the manufacturing process, and is crystallized into a bulk solid. Accordingly, the dicarbonyl-based compound is used in the form of flakes due to the nature of the manufacturing process. In general, the bulk density of the dicarbonyl-based compound present as flakes is about 8.8 g/ml which is higher than 0.8 g/ml. When the dicarbonyl-based compound having a bulk density higher than 0.8 g/ml is added, the dicarbonyl-based compound may be gelled.

The method further includes reducing the bulk density of the dicarbonyl-based compound before adding the dicarbonyl-based compound to the solution, thereby preventing or inhibiting gelation.

In the step of reducing the bulk density, the dicarbonyl-based compound may be pulverized, for example, using a mixer. Pulverization of the dicarbonyl-based compound using a mixer enables the bulk density of the dicarbonyl-based compound to be adjusted to 0.8 g/ml or less. By using a dicarbonyl-based compound having a bulk density of 0.8 g/ml or less, gelation can be prevented or inhibited.

Next, a dehydrating agent and an imidization catalyst are added to the first reaction solution and allowed to react therewith to form a second reaction solution.

During the formation of the second reaction solution, a portion of the amic acid may be imidized to form an imide repeating unit.

According to an embodiment of the present disclosure, the dehydrating agent and the imidization catalyst are added to the first reaction solution, followed by refluxing at a temperature of 60 to 80° C. for 30 minutes to 2 hours. As a result, a second reaction solution may be formed.

As the dehydrating agent, an acid anhydride such as acetic anhydride, propionic anhydride, isobutyric anhydride, pivalic anhydride, butyric anhydride, or isovaleric anhydride may be used.

As the imidation catalyst, a tertiary amine such as isoquinoline, beta-picoline, or pyridine may be used.

Next, the second reaction solution is treated to prepare a polymer resin in a solid phase.

In order to prepare the solid-phase polymer resin, a solvent may be added to the second reaction solution. The solvent may, for example, be ethanol, methanol, hexane, or the like. The solvent may be used alone or in a mixture of two or more solvents.

When a solvent that has low polarity and is miscible with the polymerization solvent is added to the second reaction solution, a solid polymer resin in a powder phase is precipitated. By filtering and drying the precipitate, a highly pure solid polymer resin can be obtained. When liquid components are removed in the process of filtering the precipitate, unreacted monomers, oligomers, additives, and reaction byproducts are removed. The polymer resin may be a polyamide-imide-based resin including an imide repeating unit and an amide repeating unit.

Next, the solid-phase polymer resin is dissolved to prepare a polymer resin solution. By dissolving the solid-phase polymer resin in a solvent, a polymer resin solution can be prepared. This step is also called "re-dissolution".

The solvent used to dissolve the solid-phase polymer resin may be the same as any of those used in the polymerization. The solvent that can be used to dissolve the solid-phase polymer resin may, for example, be a polar aprotic organic solvent such as N,N-dimethylacetamide (DMAc), N,N-dimethylformamide (DMF), 1-methyl-2-pyrrolidinone (NMP), m-cresol, tetrahydrofuran (THF), chloroform, methyl ethyl ketone (MEK), or a mixture thereof. However, the solvent according to the present disclosure is not limited thereto, and other well-known solvents may also be used.

Next, the polymer resin solution is cast.

A casting substrate is used for casting. There is no particular limitation as to the type of casting substrate. The casting substrate may be a glass substrate, a stainless steel (SUS) substrate, a Teflon substrate, or the like. According to an embodiment of the present disclosure, the casting substrate may be, for example, a glass substrate.

Specifically, casting is achieved by applying the polymer resin solution to the casting substrate. A coater, a blade, or the like may be used for casting.

After casting, the polymer resin solution is dried while the temperature is elevated to 80 to 120° C. at a rate of 2° C./rain to produce a coating film of the polymer resin. The coating film produced in this way can be said to be an intermediate of the optical film. After the coating film is pulled taut to a pin-type tenter and fixed thereto, heat treatment is performed while the temperature is elevated from 120° C. to 250° C. to 350° C. at a temperature elevation rate of 3° C./rain. When the temperature reaches the maximum coating film formation temperature, additional heat treatment may be performed in a constant-temperature atmosphere for 10 to 30 minutes. As a result, an optical film can be manufactured.

Hereinafter, the present disclosure will be described in more detail with reference to exemplary examples and comparative examples. However, the following examples and comparative examples should not be construed as limiting the scope of the present disclosure.

Example 1

397.27 g of N,N-dimethylacetamide (DMAc) was charged in a 500 mL reactor equipped with a stirrer, a nitrogen injector, a dropping funnel, a temperature controller, and a cooler while nitrogen was passed through the reactor. Then, the temperature of the reactor was adjusted to 25° C., 28.82 g (0.09 mol) of TFDB as a first diamine-based compound was dissolved therein, 3.84 g (0.01 mol) of FFDA as a second diamine-based compound was further dissolved therein, and the resulting solution was maintained at 25° C. 2.22 g (0.005 mol) of 6FDA was added to the resulting diamine solution and thoroughly dissolved therein by stirring for 2 hours. The reactor temperature was lowered to 10° C., 19.29 g (0.095 mol, bulk density of 0.67 g/ml) of terephthaloyl chloride (TPC) was added thereto, completely dissolved, and reacted for 1 hour, and then the temperature was elevated to 25° C. (first reaction solution). The TPC added to the solution was the raw material pulverized with a mixer.

The bulk density of the pulverized TPC was determined by calculating the average of three measured values in accordance with the ASTM D1895 standard using the apparent bulk density. The bulk density was 0.67 g/ml.

0.87 g of pyridine and 1.12 g of acetic anhydride were added to the first reaction solution, stirred for 30 minutes and heated to prepare a polymer resin solution having a solid concentration of 12 wt % (second reaction solution).

The obtained polymer resin solution was cast. A casting substrate was used for casting. There is no particular limitation as to the type of the casting substrate. As the casting substrate, a glass substrate, a stainless steel (SUS) substrate, a Teflon substrate, or the like may be used. According to an embodiment of the present disclosure, an organic substrate may be used as the casting substrate.

Specifically, the obtained polymer resin solution was applied onto a glass substrate, cast, and dried with hot air at 80° C. for 20 minutes and at 120° C. for 20 minutes to produce a film. Then, the produced film was peeled off of the glass substrate and fixed to a frame with a pin.

The frame to which the film was fixed was placed in an oven and then was dried with hot air at a constant temperature of 290° C. for 30 minutes. As a result, an optical film having a thickness of 50 μm was completed.

Example 2

An optical film of Example 2 was manufactured in the same manner as in Example 1, except that the addition amount of the first diamine (TFDB), the type and amount of the second diamine, the addition amount of the dianhydride-based compound (6FDA), and the addition amount of the dicarbonyl-based compound (TPC) were changed.

Examples 3 and 4

A polymer resin solution (second reaction solution) was prepared in the same manner as in Example 1, except that the addition amount of the first diamine (TFDB), the type and amount of the second diamine, the addition amount of the dianhydride-based compound (6FDA), and the addition amount of the dicarbonyl-based compound (TPC) were changed.

The obtained polymer resin solution was cast to produce a film. Then, the produced film was fixed to a frame with a pin, the frame to which the film was fixed was placed in an oven, and then was dried with hot air at a constant temperature of 260° C. for 10 minutes. As a result, optical films of Examples 3 and 4 were manufactured.

Example 5

An optical film of Example 5 was manufactured in the same manner as in Example 1, except that the addition amount of the first diamine (TFDB), the type and amount of the second diamine, the addition amount of the dianhydride-based compound (6FDA), and the addition amount of the dicarbonyl-based compound (TPC) were changed.

Example 6

A polymer resin solution (second reaction solution) was prepared in the same manner as in Example 1, except that the addition amount of the first diamine (TFDB), the type and amount of the second diamine, the addition amount of the dianhydride-based compound (6FDA), and the addition amount of the dicarbonyl-based compound (TPC) were changed. In the same manner as in Example 1, the obtained polymer resin solution was cast and dried with hot air at 80° C. for 20 minutes and at 120° C. for 20 minutes to produce a film. Then, the produced film was peeled off of the glass substrate and fixed to a frame with a pin.

The frame to which the film was fixed was placed in an oven and then was dried with hot air at a constant temperature of 270° C. for 10 minutes. As a result, an optical film having a thickness of 50 μm of Example 6 was manufactured.

Details of the addition amount of the first diamine (TFDB), the type and amount of the second diamine, the addition amount of the dianhydride-based compound (6FDA), and the addition amount of the dicarbonyl-based compound (TPC) of Examples 1 to 6 are shown in Table 1 below.

Comparative Examples 1 to 2

Optical films of Comparative Examples 1 and 2 were manufactured in the same manner as in Example 1, except that the addition amount of the first diamine (TFDB), the type and addition amount of the second diamine, the addition amount of the dianhydride-based compound (6FDA), the addition amount of the dicarbonyl-based compound (TPC), and the bulk density of the dicarbonyl-based compound (TPC) were changed.

Comparative Example 3

A polymer resin solution (second reaction solution) was prepared in the same manner as in Example 1, except that the addition amount of the first diamine (TFDB), the type and amount of the second diamine, the addition amount of the dianhydride-based compound (6FDA), the addition amount of the dicarbonyl-based compound (TPC), and the bulk density of the dicarbonyl-based compound (TPC) were changed.

The obtained polymer resin solution was cast to produce a film. Then, the produced film was fixed to a frame with a pin, and the frame to which the film was fixed was placed in an oven, and then was dried with hot air at a constant temperature of 260° C. for 10 minutes. As a result, an optical film of Comparative Example 3 was manufactured.

Comparative Example 4

An optical film of Comparative Example 4 was manufactured in the same manner as in Example 1, except that the addition amount of the first diamine (TFDB), the type and addition amount of the second diamine, the addition amount of the dianhydride-based compound (6FDA), the addition amount of the dicarbonyl-based compound (TPC), and the bulk density of the dicarbonyl-based compound (TPC) were changed.

Comparative Example 5

A polymer resin solution (second reaction solution) was prepared in the same manner as in Example 1, except that the addition amount of the first diamine (TFDB), the type and amount of the second diamine, the addition amount of the dianhydride-based compound (6FDA), the addition amount of the dicarbonyl-based compound (TPC), and the bulk density of the dicarbonyl-based compound (TPC) were changed. In the same manner as Example 1, the obtained polymer resin solution was cast and dried with hot air at 80° C. for 20 minutes and at 120° C. for 20 minutes to produce a film. Then, the produced film was peeled off of the glass substrate and fixed to a frame with a pin.

The frame to which the film was fixed was placed in an oven and then was dried with hot air at a constant temperature of 270° C. for 10 minutes. As a result, an optical film having a thickness of 50 μm of Comparative Example 5 was manufactured.

Details of the addition amount of the first diamine (TFDB), the type and amount of the second diamine, the addition amount of the dianhydride-based compound (6FDA), the addition amount of the dicarbonyl-based compound (TPC), and the bulk density of the dicarbonyl-based compound (TPC) of Comparative Examples 1 to 5 are shown in Table 1 below.

TABLE 1

| Item | Addition amount of first diamine (TFDB) (parts by mole) | Type of second diamine | Addition amount of second diamine (parts by mole) | Addition amount of dianhydride-based compound (6FDA) (parts by mole) | Addition amount of dicarbonyl-based compound (TPC) (parts by mole) | Bulk density of dicarbonyl-based compound (TPC) (g/ml) | Film thickness (μm) |
|---|---|---|---|---|---|---|---|
| Example 1 | 90 | FFDA | 10 | 5 | 95 | 0.67 | 50 |
| Example 2 | 85 | AMH | 15 | 5 | 95 | 0.67 | 50 |
| Example 3 | 90 | 4DDS | 10 | 5 | 95 | 0.67 | 50 |
| Example 4 | 75 | 3DDS | 25 | 2 | 98 | 0.67 | 50 |
| Example 5 | 95 | FFDA | 5 | 10 | 90 | 0.67 | 50 |
| Example 6 | 60 | 3DDS | 40 | 2 | 98 | 0.67 | 50 |
| Comparative Example 1 | 90 | FFDA | 10 | 5 | 95 | 0.88 | 50 |
| Comparative Example 2 | 85 | AMH | 15 | 5 | 95 | 0.88 | 50 |
| Comparative Example 3 | 90 | 4DDS | 10 | 5 | 95 | 0.88 | 50 |
| Comparative Example 4 | 100 | — | 0 | 0 | 100 | 0.67 | Impossible polymerization |
| Comparative Example 5 | 40 | 3DDS | 60 | 0 | 100 | 0.67 | 50 |

FFDA: 9,9-bis(3-fluoro-4-aminophenyl)fluorine
AMH: 2,2-bis(3-amino-4-methylphenyl)hexafluoropropane
3DDS: Bis(3-aminophenyl)sulfone
4DDS: Bis(4-aminophenyl)sulfone

Measurement Example

The following measurements were performed on the polymer resins and films produced in Examples 1 to 6 and Comparative Examples 1 to 5.

1) Yellowness index (Y.I.): The yellowness index was measured using a spectrophotometer (CM-3700D, KONICA MINOLTA) in accordance with the ASTM E313 standard.

2) Light transmittance (%): An average light transmittance at a wavelength of 360 to 740 nm was measured using a spectrophotometer (CM-3700D, KONICA MINOLTA).

3) Parallel transmittance (%): Parallel transmittance is expressed as "total transmittance diffuse transmittance". The parallel transmittance of the film was obtained by measuring the parallel transmittance of a sample film having a size of 50 mm×50 mm three times using a haze meter (model name: HM-150, MURAKAMI Corporation) and calculating the average of the three measurement values.

4) 20° gloss (GU) and RSPEC (GU): 20° gloss (GU) and RSPEC (GU) were measured by placing white paper under one side of a sample film having a size of 30 mm×100 mm and performing measurement on the surface of the film using a gloss meter (Rhopoint Instruments, RHOPOINT IQ).

5) Optical index of film (%/GU): the optical index of the film was calculated in accordance with Equation 1 below using the measured parallel transmittance, 20° gloss and RSPEC of the film.

$$\text{Optical Index} = \frac{\text{Parallel transmittance}}{20^\circ\ \text{Gloss} - RSPEC} \quad \text{[Equation 1]}$$

The measurement results are shown in Table 2 below.

TABLE 2

| Item | Yellowness index (Y.I.) | Light transmittance (%) | Parallel transmittance (%) | 20° gloss (GU) | RSPEC (GU) | 20° gloss-RSPEC (GU) | Optical index (%/GU) |
|---|---|---|---|---|---|---|---|
| Example 1 | 2.92 | 88.90 | 87.5 | 218.0 | 158.1 | 59.9 | 1.46 |
| Example 2 | 2.81 | 89.27 | 88.0 | 238.0 | 173.4 | 64.6 | 1.36 |
| Example 3 | 1.79 | 88.98 | 87.7 | 236.0 | 169.1 | 66.9 | 1.31 |
| Example 4 | 2.12 | 88.71 | 87.5 | 222.0 | 161.4 | 60.6 | 1.44 |
| Example 5 | 2.12 | 89.33 | 87.7 | 219.3 | 169.0 | 50.3 | 1.74 |
| Example 6 | 2.52 | 88.63 | 87.5 | 217.7 | 163.0 | 54.7 | 1.60 |
| Comparative Example 1 | 3.40 | 88.67 | 87.2 | 225.0 | 98.3 | 126.7 | 0.69 |
| Comparative Example 2 | 3.16 | 89.11 | 87.6 | 241.0 | 124.4 | 116.6 | 0.75 |
| Comparative Example 3 | 2.15 | 88.88 | 87.4 | 265.0 | 133.3 | 131.7 | 0.66 |
| Comparative Example 4 | Impossible polymerization | Impossible polymerization | Impossible polymerization | Impossible polymerization | Impossible polymerization | Impossible polymerization | Impossible polymerization |
| Comparative Example 5 | 4.68 | 87.78 | 86.4 | 232.7 | 116.4 | 116.3 | 0.78 |

As can be seen from the results of measurement of Table 2, the films of Examples 1 to 6 of the present disclosure exhibited excellent yellowness index and light transmittance, and had a high optical index of 1.0%/GU or more, in other words, superior optical properties.

However, in Comparative Example 4, polymerization was impossible due to gelation, and thus a film could not be produced. In Comparative Examples 1, 2, and 5, the yellowness index exceeded 3.0. In Comparative Example 5, light transmittance was less than 88.50%, so visibility was poor compared to the films of Examples 1 to 6. In addition, in Comparative Examples 1 to 3 and 5, the optical index of the film was less than 1.0%/GU.

EXPLANATION OF REFERENCE NUMERALS

100: Optical film
200: Display device
501: Display panel

The invention claimed is:

1. An optical film comprising a polymer resin comprising a first repeating unit, a second repeating unit, a third repeating unit, and a fourth repeating unit, the optical film having an optical index, calculated using the following Formula 1, of 1.0%/GU or more:

$$\text{Optical Index} = \frac{\text{Parallel transmittance}}{20^\circ\ \text{Gloss} - RSPEC} \qquad \text{[Equation 1]}$$

wherein a parallel transmittance of the optical film is obtained by measuring a parallel transmittance of a sample film having a size of 50 mm×50 mm three times using a haze meter and calculating an average of three measurement values, and 20° gloss and RSPEC of the optical film are measured by placing white paper under one side of a sample film having a size of 30 mm×100 mm and performing measurement on a surface of the optical film using a gloss meter, wherein the first repeating unit is an imide repeating unit derived from a first diamine-based compound and a dianhydride-based compound, the second repeating unit is an imide repeating unit derived from a second diamine-based compound and the dianhydride-based compound, the third repeating unit is an amide repeating unit derived from the first diamine-based compound and a dicarbonyl-based compound, and the fourth repeating unit is an amide repeating unit derived from the second diamine-based compound and the dicarbonyl-based compound, wherein the first diamine-based compound is 2,2'-bis(trifluoromethyl)benzidine (TFDB) and the second diamine-based compound comprises an aromatic diamine-based compound, and a sum of numbers of the third and fourth repeating units is 80% or more of a total number of repeating units including the first to fourth repeating units.

2. The optical film according to claim 1, wherein the second diamine-based compound comprises at least one selected from the group consisting of bis(3-aminophenyl) sulfone (3DDS), bis(4-aminophenyl)sulfone (4DDS), 2,2-bis(3-amino-4-methylphenyl)hexafluoropropane (AMH), 9,9-bis(4-aminophenyl)fluorene (FDA), 9,9-bis(3-fluoro-4-aminophenyl)fluorene (FFDA), m-phenylene diamine (mPDA), p-methylene dianiline (pMDA), m-methylene dianiline (mMDA), 1,3-bis(3-aminophenoxy)benzene (133APB), 1,3-bis(4-aminophenoxy)benzene (134APB), 1,4-bis(4-aminophenoxy)benzene (144APB), 2,2'-bis(3-aminophenyl)hexafluoropropane (33-6F), 2,2'-bis(4-aminophenyl)hexafluoropropane (44-6F), 2,2-bis(3-amino-4-hydroxy-phenyl)-hexafluoropropane (6FAP), 2,2-bis(4-(4-aminophenoxy)phenyl)hexafluoropropane (HFBAPP), bis(4-(4-aminophenoxy)phenyl)sulfone (BAPS), bis(4-(3-aminophenoxy)phenyl)sulfone (BAPSM), 2,2-bis(4-(4-aminophenoxy)phenyl propane (BAPP), 4,4-bis(4-aminophenoxy)biphenyl (BAPB), 3,3-diamino-4,4,-dihydroxydiphenylsulfone (DABS), 2,2,-bis(3-amino-4-hydroxyphenyl)propane (BAP), 4,4'-oxydianiline (4-ODA), and 3,3'-oxydianiline (3-ODA).

3. The optical film according to claim 1, wherein a ratio of a number of repeating units derived from the first diamine-based compound to a number of repeating units derived from the second diamine-based compound is 95:5 to 50:50.

4. The optical film according to claim 1, wherein the optical film has a yellowness index (Y.I.) of 3.0 or less based on a thickness of 50 μm.

5. The optical film according to claim 1, wherein the optical film has a light transmittance of 88.50% or more based on a thickness of 50 μm.

6. The optical film according to claim 1, wherein the optical film has a 20° gloss of 200 to 250 GU based on a thickness of 50 μm.

7. The optical film according to claim 1, wherein the optical film has an RSPEC of 140 to 190 GU based on a thickness of 50 μm.

8. A display device comprising:

a display panel; and the optical film according to claim 1 disposed on the display panel.

9. A method for manufacturing an optical film, the method comprising:

forming a first reaction solution using a first diamine-based compound, a second diamine-based compound, a dianhydride-based compound, and a dicarbonyl-based compound;

adding a dehydrating agent and an imidization catalyst to the first reaction solution and allowing a reaction to occur therebetween to form a second reaction solution;

treating the second reaction solution to prepare a polymer resin in a solid phase;

dissolving the solid-phase polymer resin to prepare a polymer resin solution; and casting the polymer resin solution, wherein the first diamine-based compound is 2,2'-bis(trifluoromethyl)benzidine (TFDB) and the second diamine-based compound comprises an aromatic diamine-based compound, the dicarbonyl-based compound has a bulk density of 0.5 to 0.8 g/ml, and a content of the dicarbonyl-based compound is 80 parts by mole or more and a content of the dianhydride-based compound is 20 parts by mole or less with respect to 100 parts by mole of a total content of the first diamine-based compound and the second diamine-based compound.

10. The method according to claim 9, further comprising reducing the bulk density of the dicarbonyl-based compound before forming the first reaction solution.

11. The method according to claim 9, wherein the second diamine-based compound comprises at least one selected from the group consisting of bis(3-aminophenyl)sulfone (3DDS), bis(4-aminophenyl)sulfone (4DDS), 2,2-bis(3-amino-4-methylphenyl)hexafluoropropane (AMH), 9,9-bis(4-aminophenyl)fluorene (FDA), 9,9-bis(3-fluoro-4-amino-phenyl)fluorene (FFDA), m-phenylene diamine (mPDA), p-methylene dianiline (pMDA), m-methylene dianiline (mMDA), 1,3-bis(3-aminophenoxy)benzene (133APB), 1,3-bis(4-aminophenoxy)benzene (134APB), 1,4-bis(4-aminophenoxy)benzene (144APB), 2,2'-bis(3-aminophenyl) hexafluoropropane (33-6F), 2,2'-bis(4-aminophenyl) hexafluoropropane (44-6F), 2,2-bis(3-amino-4-hydroxy-phenyl)-hexafluoropropane (6FAP), 2,2-bis(4-(4-aminophenoxy)phenyl)hexafluoropropane (HFBAPP), bis(4-(4-aminophenoxy)phenyl)sulfone (BAPS), bis(4-(3-minophenoxy)phenyl)sulfone (BAPSM), 2,2-bis(4-(4-aminophenoxy)phenyl propane (BAPP), 4,4-bis(4-aminophenoxy)biphenyl (BAPB), 3,3-diamino-4,4,-dihydroxydiphenylsulfone (DABS), 2,2,-bis(3-amino-4-hydroxyphenyl)propane (BAP), 4,4'-oxydianiline (4-ODA), and 3,3'-oxydianiline (3-ODA).

12. The method according to claim 9, wherein a content of the first diamine-based compound is 50 to 95 parts by mole and a content of the second diamine-based compound is 5 to 50 parts by mole with respect to 100 parts by mole of a total content of the first diamine-based compound and the second diamine-based compound.

* * * * *